United States Patent [19]
Chan et al.

[11] Patent Number: 5,786,971
[45] Date of Patent: Jul. 28, 1998

[54] GROUND FAULT PROTECTION CIRCUIT FOR MULTIPLE LOADS WITH SEPARATE GFCI BRANCHES AND A COMMON NEUTRAL FOR THE GFCI ELECTRONICS

[75] Inventors: David Chan, Bellerose, N.Y.; Paul Gernhardt, Chesapeake, Va.

[73] Assignee: Leviton Manufacturing Co., Inc., Little Neck, N.Y.

[21] Appl. No.: 899,129

[22] Filed: Jul. 23, 1997

[51] Int. Cl.$^6$ .................................. H02H 3/00
[52] U.S. Cl. ...................... 361/42; 361/45; 361/115
[58] Field of Search .......................... 361/42, 44, 45, 361/46, 47, 115

[56] References Cited

U.S. PATENT DOCUMENTS

| | | | |
|---|---|---|---|
| 3,949,272 | 4/1976 | Smith | 361/42 |
| 3,953,767 | 4/1976 | Ahmed | 361/42 |
| 4,015,169 | 3/1977 | Misencik | 361/45 |

Primary Examiner—Jeffrey A. Gaffin
Assistant Examiner—Stephen W. Jackson
Attorney, Agent, or Firm—Paul J. Sutton

[57] ABSTRACT

A ground fault protection circuit for plural loads connected across a power source with plural branches which can be used where the loads are unbalanced. Each branch includes a ground fault circuit interrupter device that has a common line for the electronics of the GFCI separate from the neutral line from the power source to the load where the common lines for the electronics for the ground circuit interrupter devices in each branch are connected to a common point. The ground fault protection circuit employs plural ground fault circuit interrupter devices and eliminates nuisance tripping. The common line for the electronics for a GFCI is routed through the core of the current sensing transformer of the GFCI. The separate neutral line for the electronics, connecting the common lines for the electronics for plural GFCI devices and routing the common lines for the GFCI electronics through the core of the transformer of each GFCI, eliminate improper GFCI operation due to unbalanced loading. The ground fault protection circuit may be used for a three phase power source.

22 Claims, 4 Drawing Sheets

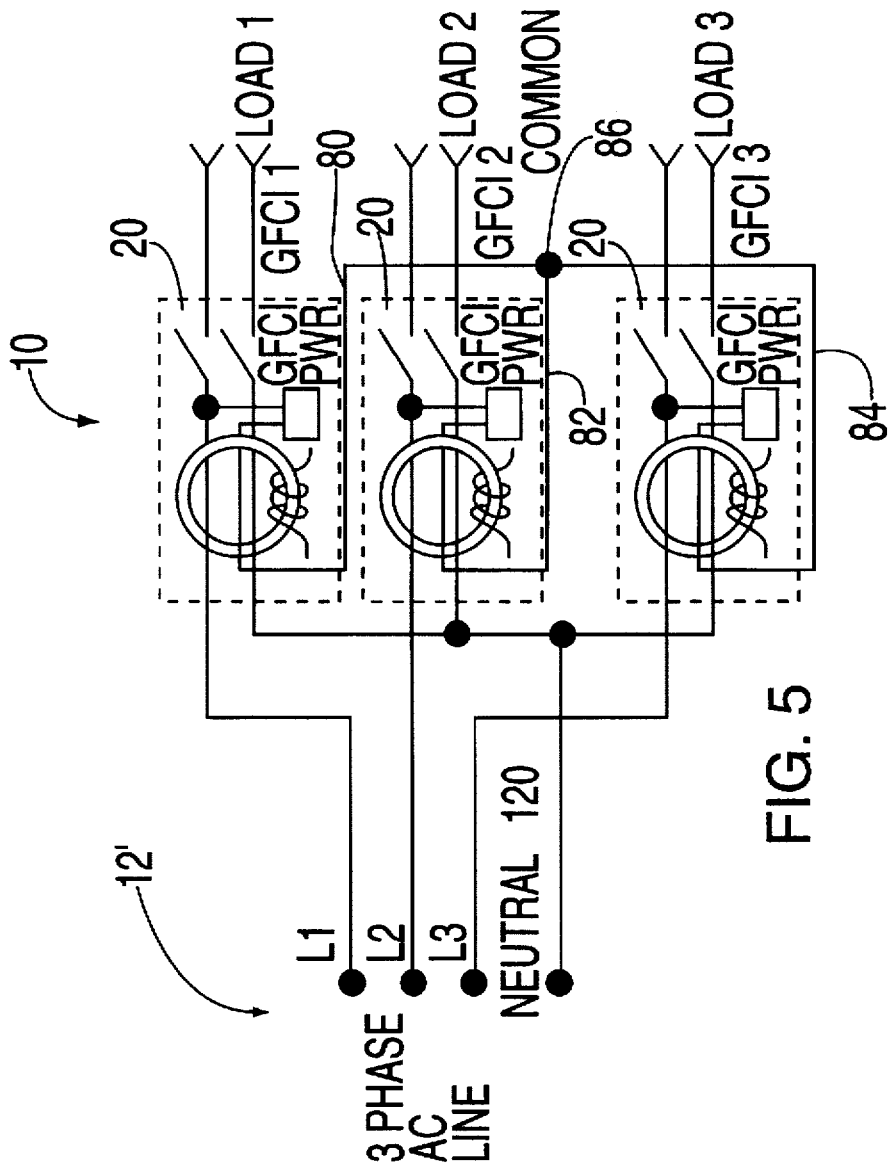

GROUND FAULT PROTECTION CIRCUIT FOR MULTIPLE LOADS WITH SEPARATE GFCI BRANCHES AND A COMMON NEUTRAL FOR THE GFCI ELECTRONICS

BACKGROUND OF THE INVENTION

1. Field Of The Invention

This invention relates to ground fault protection circuits, and more particularly, the invention relates to ground fault protection for multiple loads requiring N Volts across a 2N Volt power source.

2. Description Of The Prior Art

Ground fault circuit interrupter devices are known for detecting a ground fault condition and interrupting the flow of current from a power supply to a load when a ground fault condition is detected. Typically, a ground fault circuit interrupter device has two line terminals for receiving a phase and a neutral line from a power source. Additionally, ground fault circuit interrupter devices include a pair of terminals for connection to a load. Ground fault circuit interrupter devices include a current sensing transformer with a core and a coil wrapped around the core for sensing a ground fault condition. The ends of the coil of the transformer are delivered to a sensing circuit which typically includes an amplifier which controls a switching circuit. The switching circuit is connected to the coil of a contactor which opens and closes switches in the contactor to interrupt the current flowing from the line terminals to the load terminals in accordance with a signal from the sensing circuit. Further, ground fault circuit interrupter devices typically include a circuit for powering the ground fault circuit interrupter device including a full wave rectifier and low voltage power source. The power circuit provides power to the other electronic circuits, i.e., the switching circuit and the sensing circuit. The electronics derive their power from a connection to the phase line terminal and the return path is from the electronics to the neutral line terminal or a ground line.

In certain fields, such as the construction industry, there is a need to supply power to numerous different loads, such as tools used during the construction process. So, for example, there is a need to supply power to the power saws, power drills, jackhammers, or arc welders. Numerous loads are employed at the same time and are powered from a single power source. For a 240 Volt power source, a tap of 120 Volts may be employed to power one load, while a second tap of 120 Volts is employed to power a second load. A high current ground fault circuit interrupter device has been employed near the power source to provide ground fault protection to the numerous loads plugged into numerous receptacles of a spider box. Such an arrangement, however, is subject to nuisance tripping from the cumulative effects of leakage current in the numerous power cords extending from the spider box to the multiple loads. It has been suggested to mount together numerous ground fault circuit interrupter devices in a spider box where the separate ground fault circuit interrupter devices are in use at the same time. This arrangement would prevent nuisance tripping from affecting the operation of all the loads. Such an arrangement is unsatisfactory, however, due to problems with unbalanced loading.

When the loads are balanced, with, for example, a 140 Volt load on a first receptacle and a 140 Volt on a second receptacle, the ground fault circuit interrupter devices associated with each receptacle will respond to a hazardous condition such as a break in the neutral line. The neutral line from the power source can be broken or partly severed when the spider box is moved around a construction site with rough, rocky terrain or from one construction site to another. The ground fault circuit interrupter devices associated with the receptacles are intended to detect any hazardous condition and prevent current being supplied to the loads are made inoperable.

In fields such as the construction industry, it is frequently the case that the various loads are not evenly matched. For example, there may be a heavy load with a low impedance plugged into one receptacle and a very light load (for example, a 25 Volt load) plugged into another receptacle. The entire circuit becomes unbalanced with a low voltage at one receptacle and a high voltage, such as 180–240 Volts at the other receptacle. The receptacle with the low voltage load does not provide sufficient power to the electronics of the ground fault circuit interrupter device associated with that receptacle, thereby preventing operation of that ground fault circuit interrupter device.

There is, therefore, a need for a ground fault protection circuit for plural loads operating from taps from a power source which operates properly even when there is unbalanced loading and which is not susceptible to nuisance tripping.

SUMMARY OF THE INVENTION

It is an object of the invention to provide a ground fault protection circuit for plural loads operating off of a power supply that is not susceptible to nuisance tripping.

A further object of the invention is to provide a ground fault protection circuit for plural loads operating off of a power supply which operates properly even when there is unbalanced loading.

It is a further object of the invention to provide a ground fault circuit interrupter device that may be connected to a load or plural loads operating off of a single power supply and that may be connected to other ground fault circuit interrupter devices in such a manner that the ground fault circuit interrupter devices operate even when there is unbalanced loading.

It is still another object of the invention to provide a ground fault circuit interrupter device which is connected to a load or plural loads connected to a single power supply which is not susceptible to nuisance tripping.

Additionally, it is an object of the invention to provide a ground fault circuit interrupter device that may be connected to a load or plural loads operating off of a multiple phase power supply and that may be connected to other ground fault circuit interrupter devices in such a manner that the ground fault circuit interrupter devices operate even when there is unbalanced loading.

These and other objects of the invention are accomplished by providing a ground fault protection circuit for multiple loads, each load connected across N Volts from a 2N Volt power source comprising n branches, each branch supplying power from the power source to at least one of the loads, where n is greater than one; each branch comprising a ground fault interrupter device comprising a first set of terminals for connection to at least one of the loads; a second set of terminals for connection across N Volts from the power source; electronics including means for powering the ground fault interrupter device; a common line for the electronics separate from a neutral line from the power source to a load; and a terminal for the common line of the electronics for the ground fault interrupter device; and a common connection for the terminals for the common lines of the electronics for each ground fault interrupter device.

In a preferred embodiment of the invention, a ground fault interrupter device comprises a first set of terminals for connection to a load; a second set of terminals for connection across N Volts of a 2N Volts power source; electronics including means for powering the ground fault interrupter device; a common line for the electronics separate from a neutral line from the power source to a load; and a terminal for the common line for the electronics for the ground fault interrupter device.

In another embodiment of the invention, a method of providing ground fault protection for multiple loads, each connected across N Volts from a 2N Volt power source comprises providing n branches, each branch supplying power from the power source to at least one of the loads, where n is greater than one; connecting a ground fault interrupter device in each branch between at least one of the loads and the power source; providing a common line for the electronics of each ground fault interrupter device separate from a neutral line from the power source to the load; and connecting the common lines for the electronics of each ground fault interrupter device together.

In a further embodiment of the invention, a method of eliminating nuisance tripping of a ground fault protection device for plural loads, each connected across N Volts from a 2N Volts power source, comprises providing n branches, each branch supplying power from the power source to at least one of the loads, where n is greater than one; connecting a ground fault interrupter device in each branch between one of the loads and the power source; and eliminating voltage variations in the power for the electronics of the ground fault interrupter devices due to unbalanced loading.

In yet another embodiment, a ground fault protection circuit for multiple loads, each load connected to a phase line of a multiple phase power source comprises: n branches, each branch supplying power of a different phase from the power source to at least one of the loads, where n is greater than one; each branch comprising a ground fault interrupter device comprising: a first set of terminals for connection to at least one of the loads; a second set of terminals for connection across the power source; electronics, including means for powering the ground fault interrupter device; a common line for the electronics separate from a neutral line from the power source to a load; and a terminal for the common line of the electronics for the ground fault interrupter device.

In still another embodiment of the invention, a method of providing ground fault protection for multiple loads, each connected to a phase line of a multiple phase power source comprises providing n branches, each branch supplying a different phase of power from the power source to at least one of the loads, where n is greater than one; connecting a ground fault interrupter device in each branch between at least one of the loads and the power source; providing a common line for electronics of each ground fault interrupter device separate from a neutral line from the power source to a load; and connecting the common lines for the electronics of each ground fault interrupter device together.

The above and other objects, aspects, features and advantages of the invention would be more readily apparent from the description of the preferred embodiment thereof taken in conjunction with the accompanying drawings and appended claims.

BRIEF DESCRIPTION OF THE DRAWINGS

The invention is illustrated by way of example and not limitation in the figures of the accompanying drawings in which like reference characters denote like and corresponding parts and in which:

FIG. 5 is a schematic diagram of a fault protection circuit for plural loads connected across a power source for three phases in accordance with another embodiment of the present invention.

DESCRIPTION OF THE PREFERRED EMBODIMENTS

Figure 1:
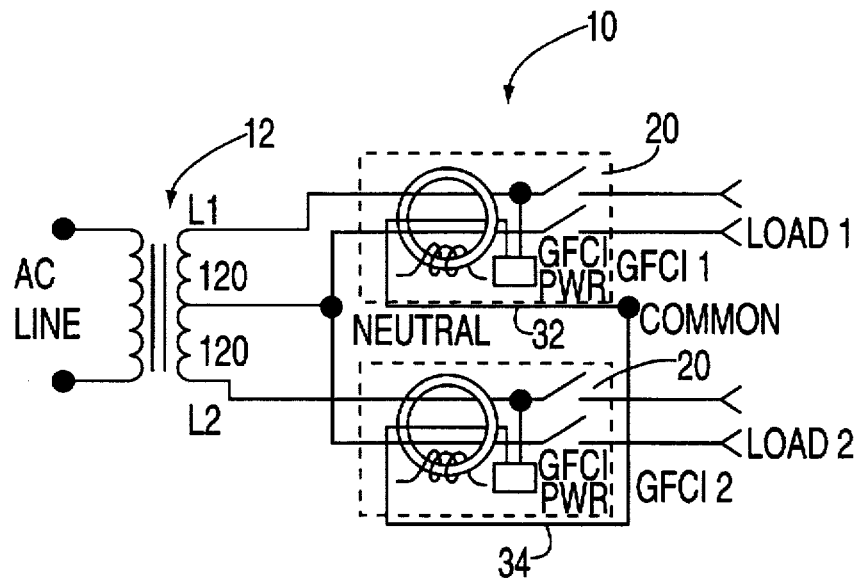
FIG. 1 is a schematic diagram of a ground fault protection circuit for two loads connected across a 240 Volt power source in accordance with an embodiment of the present invention.

The present invention is a ground fault protection circuit with n branches for plural loads, each load connected across N Volts from a power source. Referring to FIG. 1, a ground fault protection circuit 10 is shown where n is 2 and the power source is a 2N Volt power source where N is 140 Volts. More particularly, FIG. 1 illustrates an application of the present invention with two branches each with a load and each with a separate ground fault circuit interrupter device 20. The first load is connected across 140 Volts from the 240 Volt power source 12. The second load is also connected across 140 Volts from the 240 Volt power source 12. The 240 Volt power source 12 supplies a first phase line L1 and a second phase line L2. The voltage between them is 240 Volts. The power source 12 further supplies a neutral, central tap which is the neutral line for the loads. The voltage of the neutral line is halfway between the first and second phase lines L1 and L2, respectively.

The ground fault protection circuit of FIG. 1 has two branches, one branch for each of two loads. Each branch includes a ground fault circuit interrupter device 20 for interrupting power from the power source 12 to the load when a ground fault condition exists. Each ground fault circuit interrupter device 20 is of the type illustrated in FIG. 2. As illustrated, each branch has only one load. However, there may be more than one load connected to each branch.

Figure 4:
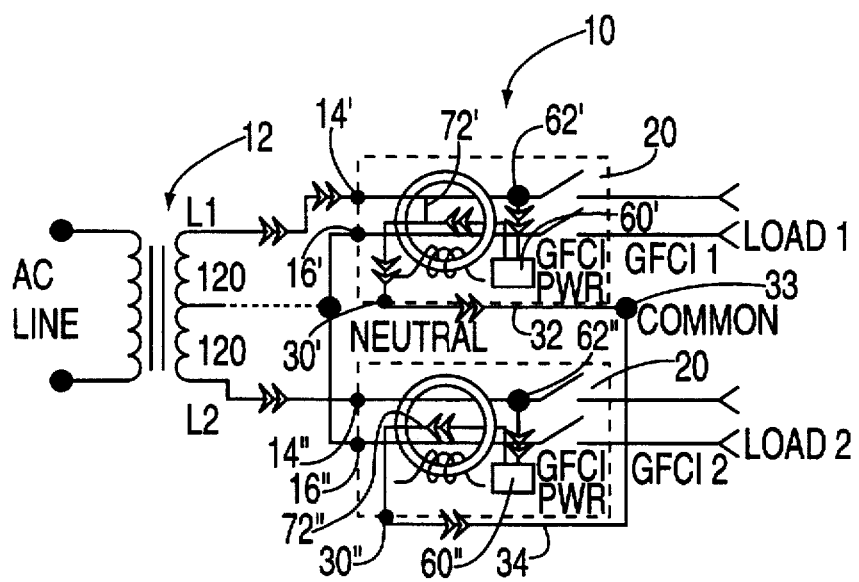
FIG. 4 is a schematic diagram of the ground fault protection circuit of FIG. 1 illustrating the path of current through the ground fault circuit interrupter devices.
Figure 2:
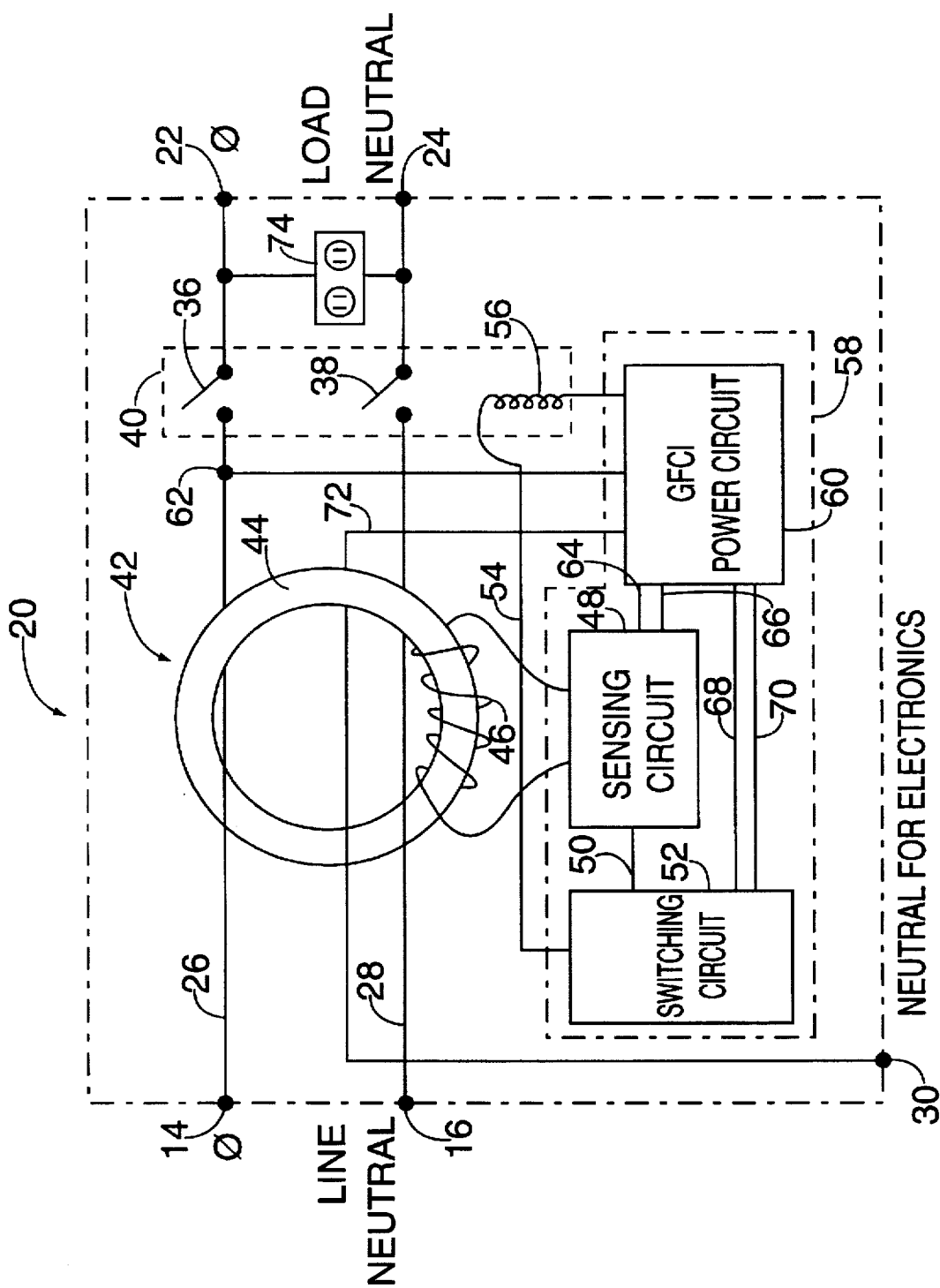
FIG. 2 is a schematic diagram of a ground fault circuit interrupter device to be used for each load in the ground fault protection circuit of FIG. 1.

As illustrated in FIG. 2, each ground fault circuit interrupter device 20 has terminals 14 and 16 for connection to the power source 12 and terminals 22 and 24 for connection to a load. Conductor 26 is the phase conductor between the phase line terminal 14 and the phase load terminal 22. Conductor 28 is the neutral line conductor between the neutral line terminal 16 and the neutral load terminal 24. Current flowing in conductors 26 and 28 is interrupted when a ground fault condition is detected in order to eliminate the hazardous condition. Ground fault circuit interrupter device 20 further has a terminal 30 for the common line for the electronics of the ground fault circuit interrupter device 20. As illustrated in FIGS. 1 and 4, the terminals of the common lines of the electronics of each ground fault circuit interrupter device 20 are connected together. Thus, there is a common connection via conductors 32 and 34 for the common lines for the electronics of each ground fault circuit interrupter device 20.

Referring to FIG. 2, the details of each ground fault circuit interrupter device 20 are illustrated. Switches 36 and 38 of contactor 40 are opened to interrupt the current flow from the line phase and neutral terminals 14 and 16, respectively, to load phase and neutral terminals 22 and 24, respectively, when a ground fault condition is detected. Current sensing transformer 42 includes a toroidal core 44 and a coil 46 wound around the toroidal core 44 in order to detect a ground fault condition. The ends of the coil 46 of the current sensing transformer 42 are input to a sensing circuit 48 to detect the ground fault condition. When a ground fault condition is detected, sensing circuit 48 outputs a signal on line 50 to switching circuit 52 which permits current to flow through line 54 and inductor 56. The current through inductor 56 causes the switches 36 and 38 of contactor 40 to open when a ground fault condition is detected. The electronics 58 of the ground fault circuit interrupter device 20 include the sensing circuit 48, the switching circuit 52 and ground fault circuit interrupter (GFCI) power circuit 60. GFCI power circuit 60 includes a full wave rectifier and low voltage power source. The GFCI power circuit 60 is powered from the line phase line from the power source 12 by a connection 62 to conductor 26 and the line phase terminal 14. Ground fault circuit interrupter (GFCI) power circuit 60 provides power to the sensing circuit 48 via the conductors 64 and 66, and further, supplies power to the switching circuit 52 via conductors 68 and 70. The neutral line for the electronics is conductor 72 from GFCI power circuit 60 to the common terminal 30. The common line 72 may act as a return line and may be connected to an independent ground point or to the line neutral line 28. The common line 72 for the electronics 58 in the ground fault circuit interrupter device 20 is routed from the GFCI power circuit 60 through the toroidal core 44 of the current sensing transformer 42 to the common terminal for the electronics 30.

Ground fault circuit interrupter device 20 further may include receptacles 74 for plugging in additional loads. Thus, each branch may have more than one load. As illustrated in FIG. 2, the common 72 line for the electronics is separate from the neutral conductor 28 between the line neutral terminal 16 and the load neutral terminal 24.

FIG. 4 illustrates the flow of current through two branches of the ground fault protection circuit of the present invention. More particularly, as illustrated in FIG. 4, current flows from the power source 12 along phase line L1 to phase line terminal 14' of GFCI 1. The current flows from connection 62' to GFCI power circuit 60' to the common line for the electronics 72' through the core of the transformer of the GFCI 1 to terminal 30' for the common line of the electronics to the conductor 32 to the common point 33. The current from line L2 of power source 12 passes to the GFCI power source 60" through connection point 62", then along neutral line 72", through the core of the second transformer to line 34 to the common point 33. The common point 33 or the common terminal 30" can be tied to an independent ground point, ground conductor or returned to the line neutral line 28.

In the two GFCI applications of the present invention illustrated in FIGS. 1 and 4, there are two loads and two branches of the ground fault protection circuit. The voltage of the power source 12 is split evenly between the loads 1 and 2. Should the neutral line of the center tap from the power source 12 break due to the frequent moving of the portable circuit from one construction site to another, or should the loads be or become unbalanced this will not affect the GFCI power circuits 60' and 60" which are isolated from the loads 1 and 2, respectively. The GFCI power circuits 60' and 60" do not depend on the load conditions having their own independent common line. Accordingly, the GFCI's will operate properly and hazardous ground fault conditions can be detected. Further, since each branch of the ground fault protection circuit has a separate GFCI, leakage current from each power conductor to each load is not enough to trip the associated GFCI. There is no nuisance tripping due to cumulative leakage current for multiple power conductors to multiple loads sensed by a single high current GFCI for multiple loads or branches.

Figure 3A:
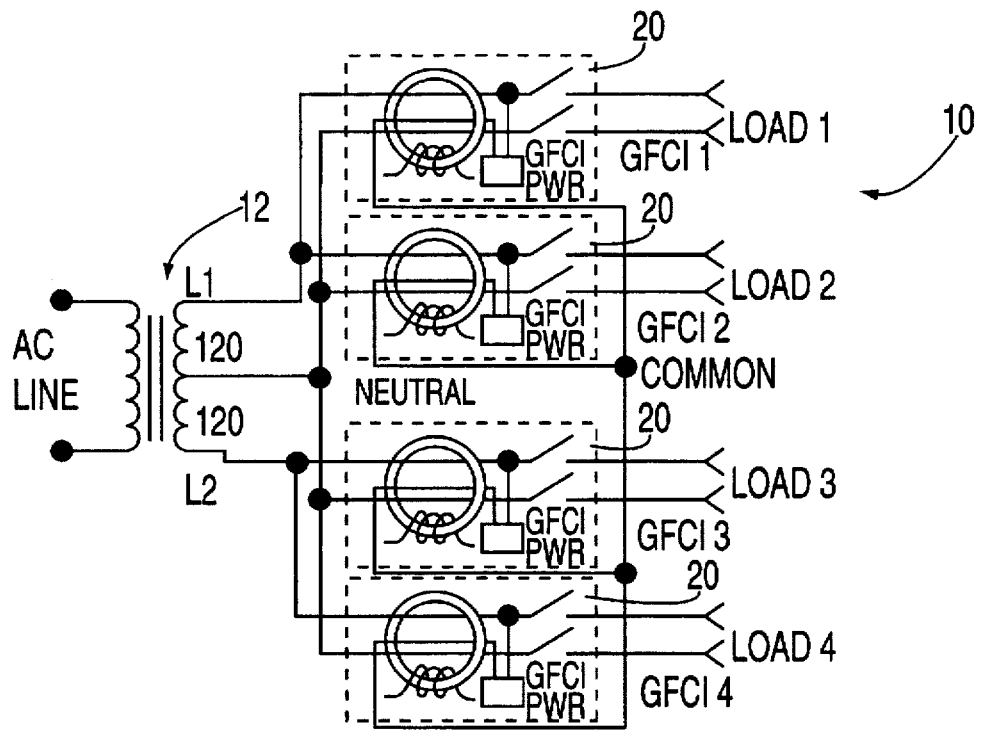
FIG. 3A is a schematic diagram of a ground fault protection circuit for four loads connected across a 240 Volt power source in accordance with another embodiment of the invention.
Figure 3B:
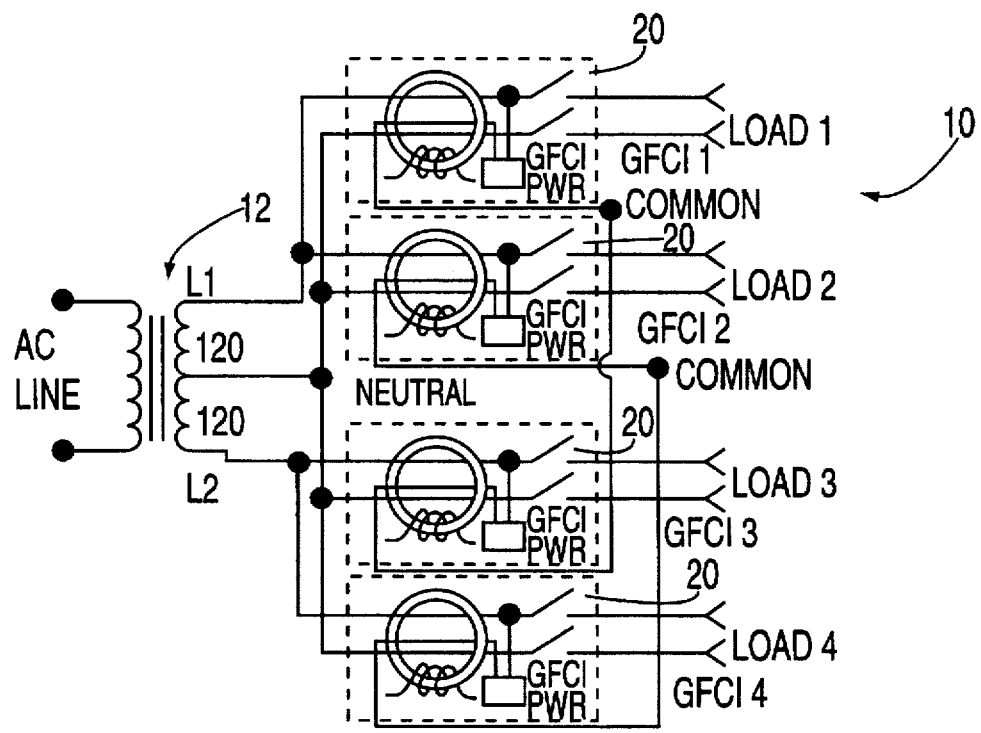
FIG. 3B is a schematic diagram of a ground fault protection circuit for four loads connected across a 240 Volt power source in accordance with another embodiment of the invention.

FIGS. 3A and B illustrate two different applications of the present invention having four branches with four GFCI's. In the ground fault protection circuits of FIGS. 3A and B, n equals 4 and N equals 140 Volts. There are four ground fault circuit interrupter devices 20, each associated with a separate load. Half of the loads are connected across the neutral tap of the power source 12 and the first phase line L1 and the other half of the loads are connected between the neutral tap of the power source 12 and the second phase line L2. As illustrated in FIG. 3A, the common terminals for the electronics of all of the GFCI's may be connected to a common point. Alternatively, in the embodiment of FIG. 3B the branches for the loads are paired. The common terminals for the electronics of GFCI power circuits at positions 1 and 3 are connected to a first common point and the GFCI power circuits at positions 2 and 4 are connected to a second, independent common point.

Typically the number of branches of loads n is an even number. However, the invention will operate with an odd number of loads and branches. The common terminals for the electronics of the GFCI's are connected to a common point. The number of branches n may be 2, 4, 6, 8 or any number that the power source 12 is able to supply power to.

The present invention may be applied to a three-phase power source 12'. A ground fault protection circuit, in accordance with the present invention for a three-phase power source, is illustrated in FIG. 5. The ground fault protection circuit 10' is for multiple loads, for example, Load 1, Load 2, and Load 3. Each load is connected to a different phase line L1, L2 and L3, respectively, of a multiple phase power source 12' and to the neutral line. There are three branches, each branch supplies power of a different phase from the power source 12' to one of the loads, Load 1, Load 2, and Load 3. Each branch includes a ground fault interrupter device 20, as described in detail above, with reference to FIG. 2. Each ground fault interrupter device 20 has a first input terminal to be connected to one phase line, i.e., L1, L2 or L3, a second input terminal to be connected to the power supply 12' neutral line, a first output to the load phase line, a second output to the load neutral line and separate connections for the GFCI power circuit 60 to the phase line and to the common point. The terminals for the common lines of the electronics of each ground fault interrupter device 20 are connected together at a common point 86. Thus, there is a common connection for the conductors 80, 82, and 84 for the common lines for the electronics of each ground fault interrupter device 20 located in each branch associated with each phase of a multiple phase power source 12'. The common line for the electronics of each ground fault interrupter device 20 is routed through the core of a current sensing transformer in route between the electronics and the terminal 86 for the common lines for each ground fault interrupter device.

As illustrated in FIG. 5, each branch has only one load. However, there may be more than one load connected to each branch. A load may be connected down line from the ground fault interrupter device 20. Further, since each ground fault circuit interrupter device 20 may include receptacles 74 (not shown) for plugging in additional loads, each branch may have more than one load.

In the circuit of FIG. 5, current may flow from the power source 12' along phase line L1 to the phase line terminal of the ground fault circuit interrupter device 20 GFCI 1. The current flows to the GFCI power circuit to the common line 80 for the electronics through the core of the transformer of the ground fault interrupter device 20 to the terminal 86 for the common lines of the electronics. Current flows to the common point 86 for the common lines for the electronics of the ground fault interrupter devices 20. The common point 86, may, as stated above, be connected to a ground point or connected to the power supply 12' neutral line, current flows from phase line L2, through the GFCI power circuit 60, the transformer core and along line 82 to the common point 86. Similarly current may flow from phase line L3, through the GFCI power circuit, the transformer core and along line 84 to the common point 86. Fewer than three phases may be employed. Alternatively, more than three phases may be employed depending on the power source.

The present invention provides ground fault protection for plural loads, each load connected across N Volts of a power source by providing n branches. The number of branches n is greater than one. Each branch may include more than one load. A ground fault interrupter device is connected in each branch between a load and the power source. A common line for the electronics of each ground fault interrupter device is separate from the neutral line from the power source to the load. The common lines for the electronics of each ground fault interrupter device are connected together. The common line for each ground fault interrupter device is routed through the core of the current sensing transformer for each ground fault interrupter device. Routing the common line for the electronics through the core of the current sensing transformer prevents the circuit from tripping on itself since the circuit accepts current from the phase line from the power source but does not supply current to the neutral line of the power source. Providing a common line for the electronics of each ground fault interrupter device separate from the neutral line from the power source to the load and connecting the common lines for each ground fault circuit interrupter device together eliminates voltage variation for the electronics of the ground fault interrupter devices due to unbalanced loading.

Each load may be connected across N Volts of a 2N Volt power source. Alternatively, the branches many be for multiple phase lines of a multiple phase power source.

Although the invention has been described with reference to the preferred embodiments, it would be apparent to one skilled in the art that variations and modifications are contemplated within the spirit and scope of the invention. The drawings and descriptions of the preferred embodiments are made by way of example rather than to limit the scope of the invention, and it is intended to cover within the spirit and scope of the invention all such changes and modifications.

We claim:

1. A ground fault protection circuit for multiple loads, each load connected across N Volts from a 2N Volt power source comprising:

a) n branches, each branch supplying power from said power source to at least one of said loads, where n is greater than one;

b) each branch comprising a ground fault interrupter device comprising:

i) a first set of terminals for connection to at least one of said loads;

ii) a second set of terminals for connection across N Volts from said power source;

iii) electronics, including means for powering said ground fault interrupter device;

iv) a common line for the electronics separate from a neutral line from the power source to a load; and v) a terminal for the common line of the electronics for the ground fault interrupter device; and c) a common connection for the terminals for the common lines of the electronics for each ground fault interrupter device.

2. The circuit according to claim 1, wherein each said ground fault interrupter device further comprises a current sensing transformer with a core; and said common line for the electronics of each ground fault interrupter device is routed through each said core from the electronics to the terminal for the neutral line.

3. The circuit according to claim 1, wherein n is an even integer.

4. The circuit according to claim 1, wherein said power source supplies first and second phase lines with a voltage of 2N Volts between said first and second phase lines and a neutral line at a voltage halfway between said first and second phase lines.

5. The circuit according to claim 1, wherein each ground fault interrupter device is connected between one of said phase lines and said neutral line of said power source.

6. The circuit according to claim 4, wherein half of n branches are connected between the first phase line and the neutral line and the other half of the n branches are connected between the second phase line and the neutral line.

7. The circuit according to claim 1, wherein there are n branches for each of three phases of power delivered from said power source.

8. A method of providing ground fault protection for multiple loads, each connected across N Volts from a 2N Volt power source comprising:

a) providing n branches, each branch supplying power from said power source to at least one of said loads, where n is greater than one;

b) connecting a ground fault interrupter device in each branch between at least one of said loads and said power source;

c) providing a common line for the electronics of each ground fault interrupter device separate from a neutral line from said power source to a load; and d) connecting the common lines for the electronics of each ground fault interrupter device together.

9. The method according to claim 8, further comprising: routing the common line for the electronics through a core of a current sensing transformer for each ground fault interrupter device.

10. A method of eliminating nuisance tripping of a ground fault protection device for plural loads, each connected across N Volts from a 2N Volts power source, comprising:

a) providing n branches, each branch supplying power from said power source to at least one of said loads, where n is greater than one;

b) connecting a ground fault interrupter device in each branch between one of said loads and said power source; and c) eliminating voltage variations in power for the electronics of said ground fault interrupter devices due to unbalanced loading.

11. The method according to claim 10, wherein the step of eliminating voltage variations comprises:
   a) providing a common line for the electronics of each ground fault interrupter device separate from a neutral line from the power source to a load; and
   b) connecting the common lines for the electronics of each ground fault interrupter device together.

12. The method of claim 11, further comprising routing the common line for the electronics through a core of a current sensing transformer for each ground fault interrupter device.

13. A ground fault interrupter device comprising:
   a) a first set of terminals for connection to a load;
   b) a second set of terminals for connection across N Volts of a power source;
   c) electronics, including means for powering said ground fault interrupter device;
   d) a common line for said electronics separate from a neutral line from said power source to a load; and
   e) a terminal for the common line for the electronics of the ground fault interrupter device.

14. The ground fault interrupter device according to claim 13, further comprising:
   a) a current sensing transformer with a core; and
   b) wherein said common line for the electronics of the ground fault interrupter device is routed through said core from the electronics to the terminal for the common line of the electronics.

15. The ground fault interrupter device according to claim 13, wherein the second set of terminals is for connection across N Volts of a 2N Volt power source.

16. The ground fault interrupter device according to claim 13, wherein the second set of terminals is for connection to one phase of a multiple phase power source.

17. A ground fault protection circuit for multiple loads, each load connected to a phase line of a multiple phase power source comprising:
   a) n branches, each branch supplying power of a different phase from said power source to at least one of said loads, where n is greater than one;
   b) each branch comprising a ground fault interrupter device comprising:
      i) a first set of terminals for connection to at least one of said loads;
      ii) a second set of terminals for connection across said power source;
      iii) electronics, including means for powering said ground fault interrupter device;
      iv) a common line for the electronics separate from a neutral line from the power source to a load; and
      v) a terminal for the common line of the electronics for the ground fault interrupter device; and
   c) a common connection for the terminals for the lines of the electronics for each ground fault interrupter device.

18. The circuit according to claim 17, wherein each said ground fault interrupter device further comprises a current sensing transformer with a core; and said common line for the electronics of each ground fault interrupter device is routed through each said core from the electronics to the terminal for the common line.

19. The circuit according to claim 17, wherein there are three phases of power delivered from said power source.

20. The circuit according to claim 17, wherein there are n branches, one branch for each of three phases of power.

21. A method of providing ground fault protection for multiple loads, each connected to a phase line of a multiple phase power source comprising:
   a) providing n branches, each branch supplying a different phase of power from said power source to at least one of said loads, where n is greater than one;
   b) connecting a ground fault interrupter device in each branch between at least one of said loads and said power source;
   c) providing a common line for electronics of each ground fault interrupter device separate from a neutral line from said power source to a load; and
   d) connecting the common lines for the electronics of each ground fault interrupter device together.

22. The method according to claim 21, further comprising:
   routing the common line for the electronics through a core of a current sensing transformer for each ground fault interrupter device.

* * * * *